United States Patent
Suh

(10) Patent No.: US 10,122,425 B2
(45) Date of Patent: Nov. 6, 2018

(54) APPARATUS AND METHOD FOR TRANSMITTING AND RECEIVING TRANSMISSION BEAM INFORMATION AND CHANNEL QUALITY INFORMATION IN COMMUNICATION SYSTEM SUPPORTING MULTI-USER MULTI-INPUT MULTI-OUTPUT SCHEME

(71) Applicant: Samsung Electronics Co., Ltd., Suwon-si, Gyeonggi-do (KR)

(72) Inventor: Sang-Wook Suh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 15/176,772

(22) Filed: Jun. 8, 2016

(65) Prior Publication Data
US 2016/0359531 A1 Dec. 8, 2016

(30) Foreign Application Priority Data
Jun. 8, 2015 (KR) .................. 10-2015-0080610

(51) Int. Cl.
*H04B 7/04* (2017.01)
*H04B 7/0426* (2017.01)
(Continued)

(52) U.S. Cl.
CPC ........... *H04B 7/043* (2013.01); *H04B 7/0452* (2013.01); *H04B 7/063* (2013.01); *H04B 7/0632* (2013.01); *H04B 7/0665* (2013.01); *H04B 7/0695* (2013.01); *H04B 7/088* (2013.01); *H04B 17/336* (2015.01)

(58) Field of Classification Search
None
See application file for complete search history.

(56) References Cited

U.S. PATENT DOCUMENTS

2009/0060060 A1* 3/2009 Stadelmeier ........... H04B 3/542
375/257
2010/0127931 A1* 5/2010 Rensburg ................. H01Q 3/04
342/372
(Continued)

FOREIGN PATENT DOCUMENTS

WO 2014/104854 A1 7/2014

OTHER PUBLICATIONS

Renesas Mobile Europe Ltd; Physical channels coverage enhancements for MTC; 3GPP TSG RAN WG1 Meeting #72; R1-130423; Jan. 28-Feb. 1, 2013; St Julian's, Malta.

*Primary Examiner* — Christine T Duong
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for receiving transmission beam (Tx beam) information by a user equipment (UE) in a communication system supporting a multi-user multi-input multi-output (MU-MIMO) scheme is provided. The method includes transmitting information on a selected Tx beam to a base station (BS), and receiving Tx beam information including information for a Tx beam selected by at least one UE other than the UE from the BS.

14 Claims, 10 Drawing Sheets

(51) Int. Cl.
    *H04B 7/0452*     (2017.01)
    *H04B 7/06*     (2006.01)
    *H04B 7/08*     (2006.01)
    *H04B 17/336*     (2015.01)

(56) References Cited

U.S. PATENT DOCUMENTS

| | | |
|---|---|---|
| 2013/0301454 A1 | 11/2013 | Seol et al. |
| 2013/0343303 A1* | 12/2013 | Kim .................. H04B 7/0452 370/329 |
| 2014/0185478 A1 | 7/2014 | Kuo |
| 2014/0233498 A1 | 8/2014 | Chen et al. |
| 2014/0254517 A1 | 9/2014 | Nam et al. |
| 2014/0269395 A1 | 9/2014 | Chen et al. |
| 2015/0333893 A1 | 11/2015 | Lee et al. |

* cited by examiner

APPARATUS AND METHOD FOR TRANSMITTING AND RECEIVING TRANSMISSION BEAM INFORMATION AND CHANNEL QUALITY INFORMATION IN COMMUNICATION SYSTEM SUPPORTING MULTI-USER MULTI-INPUT MULTI-OUTPUT SCHEME

CROSS-REFERENCE TO RELATED APPLICATION(S)

This application claims the benefit under 35 U.S.C. § 119(a) of a Korean patent application filed on Jun. 8, 2015 in the Korean Intellectual Property Office and assigned Serial No. 10-2015-0080610, the entire disclosure of which is hereby incorporated by reference.

TECHNICAL FIELD

The present disclosure relates to an apparatus and method for transmitting and receiving transmission beam (Tx beam) information and channel quality information in a communication system supporting a multi-user multi-input multi-output (MU-MIMO) scheme. More particularly, the present disclosure relates to an apparatus and method for transmitting and receiving Tx beam information and channel quality information in a case that a millimeter wave (mmWave) beamforming scheme is used in a communication system supporting a MU-MIMO scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding and modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In a communication system supporting a multi-user MIMO (MU-MIMO) scheme, each user equipment (UE) feeds back channel quality information based on a channel status between each UE and a base station (BS) for communication with the BS. For example, the channel quality information may be a channel quality index (CQI).

The BS determines a modulation and coding scheme (MCS) level for each UE based on the channel quality information fed back by each UE, and transmits data to each UE based on the MCS level.

Recently, in broadband carrier transmission using a mmWave band which has emerged as 5G communication, an array antenna is used as each transmission antenna (Tx antenna), so a beam gain may be acquired based on radio frequency (RF) beamforming. In this case, a UE performs a beam sweeping process for each Tx antenna, and selects an optimal Tx antenna and an optimal transmission beam (Tx beam) based on a result of the beam sweeping process.

In a communication system supporting a single-user MIMO (SU-MIMO) scheme, a UE knows a beam index for each of a plurality of Tx antennas included in a BS, so the UE may determine a CQI based on the beam index for each of the plurality of Tx antennas.

Alternatively, in a communication system supporting a MU-MIMO scheme, each UE knows only a beam index for a Tx antenna allocated to each UE among a plurality of Tx antennas included in a BS and does not know beam indexes for Tx antennas allocated to other UEs. Each UE does not know beam indexes for Tx antennas allocated to other UEs, so each UE may not detect interference due to beams for the Tx antennas allocated to the other UEs and determine a correct CQI.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving Tx beam information in a communication system supporting a multi-user multi-input multi-output (MU-MIMO) scheme.

Another aspect of the present disclosure is to provide an apparatus and method for transmitting and receiving Tx beam information in a case that a mmWave beamforming scheme is used in a communication system supporting a MU-MIMO scheme.

Another aspect of the present disclosure is to provide an apparatus and method for transmitting and receiving channel quality information in a communication system supporting a MU-MIMO scheme.

Another aspect of the present disclosure is to provide an apparatus and method for transmitting and receiving channel quality information in a case that a mmWave scheme is used in a communication system supporting a MU-MIMO scheme.

Another aspect of the present disclosure is to provide an apparatus and method for generating channel quality information by considering interference strength in a case that a mmWave scheme is used in a communication system supporting a MU-MIMO scheme.

Another aspect of the present disclosure is to provide an apparatus and method for generating channel quality information based on Tx beam information for UEs other than a UE in a communication system supporting a MU-MIMO scheme.

In accordance with an aspect of the present disclosure, a method for receiving transmission beam (Tx beam) information by a user equipment (UE) in a communication system supporting a MU-MIMO scheme is provided. The method includes transmitting information on a selected Tx beam to a base station (BS), and receiving Tx beam information including information for a Tx beam selected by at least one UE other than the UE from the BS.

In accordance with another aspect of the present disclosure, a method for transmitting Tx beam information by a BS in a communication system supporting a MU-MIMO scheme is provided. The method includes receiving Tx beam information on a Tx beam selected by a first UE from the first UE, and transmitting the received Tx beam information to at least one second UE.

In accordance with another aspect of the present disclosure, a UE in a communication system supporting a MU-MIMO scheme is provided. The UE includes a transmitter configured to transmit information on a selected Tx beam to a BS, and a receiver configured to receive Tx beam information including information for a Tx beam selected by at least one UE other than the UE from the BS.

In accordance with another aspect of the present disclosure, a BS in a communication system supporting a MU-MIMO scheme is provided. The BS includes a receiver configured to receive Tx beam information on a Tx beam selected by a UE from the UE, and a transmitter configured to transmit the Tx beam information to at least one UE other than the UE.

In accordance with another aspect of the present disclosure, a non-transitory computer-readable storage medium is provided. The non-transitory computer-readable storage medium stores instructions that, when executed, cause at least one processor of a user equipment (UE) in a communication system supporting a multi-user multi-input multi-output (MU-MIMO) scheme to perform a method, the method comprising: transmitting information on a selected Tx beam to a base station (BS); and receiving Tx beam information including information for a Tx beam selected by at least one UE other than the UE from the BS.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
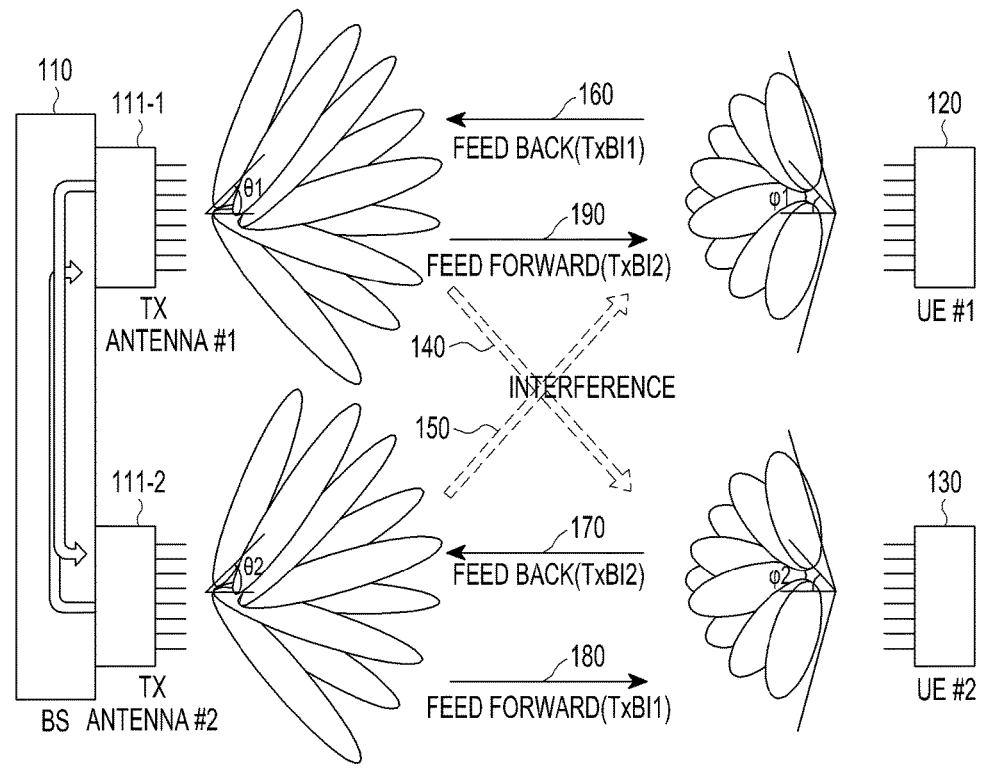
FIG. 1 schematically illustrates an example of a cross-forwarding process in a case that a millimeter Wave (mmWave) beamforming scheme is used in a communication system supporting a multi-user multi-input multi-output (MU-MIMO) scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) may be an electronic device.

According to various embodiments of the present disclosure, a signal transmitting apparatus may be a UE or a base station (BS).

According to various embodiments of the present disclosure, a signal receiving apparatus may be a UE or a BS.

According to various embodiments of the present disclosure, a signal transmitting/receiving apparatus may be a UE or a BS.

In various embodiments of the present disclosure, the term UE may be interchangeable with the term mobile station (MS), wireless terminal, mobile device, and the like.

In various embodiments of the present disclosure, the term BS may be interchangeable with the term node B, evolved node B (eNB), access point (AP), and the like.

In various embodiments of the present disclosure, the term "transmit" may be interchangeable with the term "feed back", "feed forward", and the like.

An embodiment of the present disclosure proposes an apparatus and method for transmitting and receiving transmission beam (Tx beam) information in a communication system supporting a multi-user multi-input multi-output (MU-MIMO) scheme.

An embodiment of the present disclosure proposes an apparatus and method for transmitting and receiving Tx beam information in a case that a millimeter Wave (mm-Wave) beamforming scheme is used in a communication system supporting a MU-MIMO scheme.

An embodiment of the present disclosure proposes an apparatus and method for transmitting and receiving channel quality information in a communication system supporting a MU-MIMO scheme.

An embodiment of the present disclosure proposes an apparatus and method for transmitting and receiving channel quality information in a case that a mmWave scheme is used in a communication system supporting a MU-MIMO scheme.

An embodiment of the present disclosure proposes an apparatus and method for generating channel quality information by considering interference strength in a case that a mmWave scheme is used in a communication system supporting a MU-MIMO scheme.

An embodiment of the present disclosure proposes an apparatus and method for generating channel quality information based on Tx beam information for UEs other than a UE in a communication system supporting a MU-MIMO scheme.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

In an embodiment of the present disclosure, for example, Tx beam information may be a Tx beam index.

In an embodiment of the present disclosure, for example, channel quality information may be a channel quality index (CQI).

In an embodiment of the present disclosure, a UE corrects a signal to interference and noise ratio (SINR) based on received signal strength per Tx beam measured upon performing a beam sweeping process for detecting an optimal transmission antenna (Tx antenna) and an optimal Tx beam, and determines a CQI based on the corrected SINR.

In an embodiment of the present disclosure, it will be assumed that an SINR is used as an example of information indicating channel status. However, various metrics such as received signal code power (RSCP), reference signal received power (RSRP), a reference signal strength indicator (RSSI), reference signal received quality (RSRQ), a carrier-to-interference noise ratio (CINR), a signal-to-noise ratio (SNR), a block error rate (BLER), and/or the like may be used as the information indicating the channel status.

That is, a received signal strength for each of beams applied to a plurality of Tx antennas included in a BS which is measured by a UE becomes interference strength for UEs other than the UE if a corresponding beam is used for the other UEs.

Therefore, a UE may detect interference strength if the UE knows Tx beam indexes allocated to UEs other than the UE.

An effective SINR for determining CQI may be expressed as Equation 1.

$$\gamma_{eff} = \frac{P_S}{P_I + P_N} \quad \text{Equation 1}$$

In Equation 1, $\gamma_{eff}$ denotes an effective SINR, $P_S$ denotes signal strength, $P_I$ denotes interference strength, and $P_N$ denotes noise strength.

The UE may measure $P_N$ if there is no signal transmitted from a signal transmitting apparatus, e.g., a BS to the UE. The UE may measure $P_S$ and $P_I$ while performing a beam sweeping process.

Therefore, in a case that a UE may know Tx beam indexes allocated to UEs other than the UE, the UE may substitute $P_I$ which corresponds to Tx beam indexes allocated to the UEs to an equation for determining an effective SINR expressed in Equation 1. In this case, the effective SINR may be determined based on correct $P_I$, so the CQI determined based on the effective SINR also becomes correct.

In a case that a mmWave beamforming scheme is used in a communication system supporting a MU-MIMO scheme according to an embodiment of the present disclosure, a beam sweeping process needs to be performed for beams of various directions for detecting an optimal Tx antenna and an optimal Tx beam.

In an embodiment of the present disclosure, a detailed description of a beam sweeping process will be omitted, and a cross-forwarding process for an optimal Tx beam pattern index selected through the beam sweeping process will be described below.

An example of a cross-forwarding process in a case that a mmWave beamforming scheme is used in a communication system supporting a MU-MIMO scheme according to an embodiment of the present disclosure will be described with reference to FIG. 1.

FIG. 1 schematically illustrates an example of a cross-forwarding process in a case that a mmWave beamforming scheme is used in a communication system supporting a MU-MIMO scheme according to an embodiment of the present disclosure.

Referring to FIG. 1, a communication system supporting a MU-MIMO scheme includes a BS 110, and a plurality of UEs, e.g., N UEs, e.g., two UEs, e.g., a UE#1 120 and a UE#2 130. The BS 110 includes a plurality of Tx antennas, e.g., M Tx antennas, e.g., two Tx antennas, e.g., a Tx antenna#1 111-1 and a Tx antenna#2 111-2.

In a case that a mmWave beamforming scheme is used in a signal transmitting apparatus or a signal transmitting/receiving apparatus, a beam sweeping process is performed for Tx beams of various directions as illustrated in FIG. 1 for detecting an optimal TX antenna and an optimal Tx beam.

It will be assumed that the UE#1 120 receives data corresponding to one of Tx beam patterns provided in the Tx antennal#1 111-1, and the UE#2 130 receives data corresponding to one of Tx beam patterns provided in the Tx antennal#2 111-2, according to the beam sweeping process. In this case, the Tx beam patterns provided in the Tx antennal#1 111-1 act as interference for the UE#2 130 (140), and the Tx beam patterns provided in the Tx antennal#2 111-2 act as interference for the UE#1 120 (150).

The UE#1 120 determines to receive data corresponding to one of the Tx beam patterns provided in the Tx antenna#1 111-1, that is, the UE#1 120 selects the Tx antenna#1 111-1 as an optimal Tx antenna, and selects one of the Tx beam patterns provided in the Tx antenna#1 111-1 as an optimal Tx beam. Therefore, the UE#1 120 transmits feedback information that the optimal Tx beam pattern is set as one of Tx beam patterns provided in the Tx antenna#1 111-1 (160). The feedback information transmitted from the UE#1 120 to the BS 110 includes an optimal Tx beam pattern index, and it will be assumed that the optimal Tx beam pattern index is one of Tx beam pattern indexes provided in the Tx antenna#1 111-1, e.g., a Tx beam index 1 (TxBI1).

The UE#2 130 determines to receive data corresponding to one of the Tx beam patterns provided in the Tx antenna#2 111-2, that is, the UE#2 130 selects the Tx antenna#2 111-2 as an optimal Tx antenna, and selects one of the Tx beam patterns provided in the Tx antenna#2 111-2 as an optimal Tx beam. Therefore, the UE#2 130 transmits feedback information that the optimal Tx beam pattern is set as one of Tx beam patterns provided in the Tx antenna#2 111-2 (170). The feedback information transmitted from the UE#2 130 to the BS 110 includes an optimal Tx beam pattern index, and it will be assumed that the optimal Tx beam pattern index is one of Tx beam pattern indexes provided in the Tx antenna#2 111-2, e.g., a Tx beam index 2 (TxBI2).

As described in Equation 1, an effective SINR required for a UE to determine a CQI may be detected correctly if the UE knows interference strength correctly. Therefore, in an embodiment of the present disclosure, a BS transmits an optimal Tx beam pattern index included in feedback information received from a specific UE to remaining UEs except for the specific UE.

For example, in FIG. 1, the BS 110 feeds forward the optimal Tx beam pattern index received from the UE#1 120 to remaining UEs except for the UE#1 120 among UEs to which the BS 110 provides a service, e.g., the UE#2 130 (180).

After receiving the optimal Tx beam pattern index that the BS 110 receives from the UE#1 120 from the BS 110, the UE#2 130 determines an effective SINR as described in Equation 1 by setting strength which corresponds to the optimal Tx beam pattern index received from the UE#1 120, i.e., TxBI1 as interference strength PI.

For example, in FIG. 1, the BS 110 feeds forward the optimal Tx beam pattern received from the UE#2 130 to remaining UEs except for the UE#2 130 among UEs to which the BS 110 provides a service, e.g., the UE#1 120 (190).

After receiving the optimal Tx beam pattern index that the BS 110 receives from the UE#2 130 from the BS 110, the UE#1 120 determines an effective SINR as described in Equation 1 by setting strength which corresponds to the optimal Tx beam pattern index received from the UE#2 130, e.g., TxBI2 as interference strength PI.

In an embodiment of the present disclosure, it will be assumed that a timing point at which an optimal Tx beam pattern index is transmitted is identical to a timing point at which a UE transmits a CQI.

Alternatively, the optimal Tx beam pattern index may be transmitted at a timing point different from a timing point at which the CQI is transmitted. A detailed description of the timing point at which the CQI is transmitted will be omitted herein.

In an embodiment of the present disclosure, it will be assumed that a message with which a UE transmits an optimal Tx beam pattern index is identical to a message with which the UE transmits a CQI.

Alternatively, the optimal Tx beam pattern index may be transmitted through a message different from the message through which the CQI is transmitted. A detailed description of the message used for transmitting the optimal Tx beam pattern index will be omitted herein.

In an embodiment of the present disclosure, a period by which a CQI and an optimal Tx beam pattern index are transmitted may be variable. In an embodiment of the present disclosure, the period by which the CQI and the optimal Tx beam pattern index are transmitted may be determined as a period during which channel status is static.

For convenience, a process in which a BS transmits a Tx beam pattern index received from a UE to UEs other than the UE as described above will be referred to as "cross-forwarding process". By means of the cross-forwarding process, a UE may know optimal Tx beam indexes for UEs other than the UE, and detect a strength of a signal which corresponds to the optimal Tx beam indexes for the UEs other than the UE as interference strength. The UE may detect interference strength correctly, so the UE may detect an effective SINR correctly and detect a CQI correctly.

An example of a cross-forwarding process in a case that a mmWave beamforming scheme is used in a communication system supporting a MU-MIMO scheme according to an embodiment of the present disclosure has been described with reference to FIG. 1, and another example of a cross-forwarding process in a case that a mmWave beamforming scheme is used in a communication system supporting a MU-MIMO scheme according to an embodiment of the present disclosure will be described with reference to FIG. 2.

Figure 2:
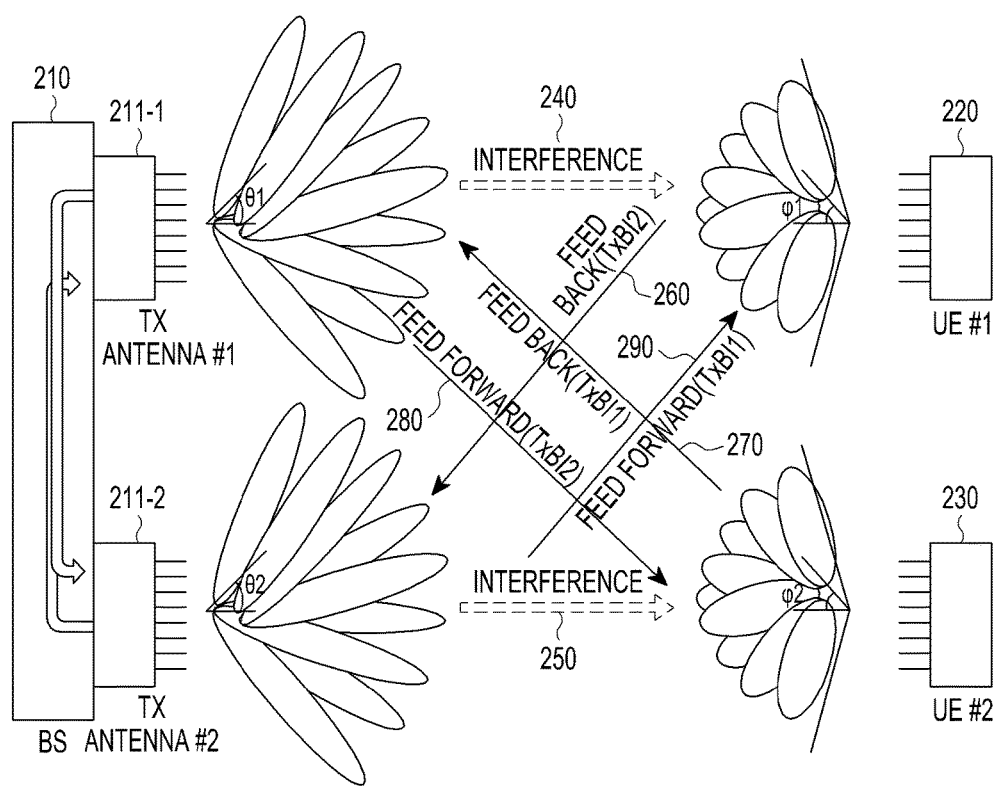
FIG. 2 schematically illustrates another example of a cross-forwarding process in a case that a mmWave beamforming scheme is used in a communication system supporting a MU-MIMO scheme according to an embodiment of the present disclosure.

FIG. 2 schematically illustrates another example of a cross-forwarding process in a case that a mmWave beamforming scheme is used in a communication system supporting a MU-MIMO scheme according to an embodiment of the present disclosure.

Referring to FIG. 2, a communication system supporting a MU-MIMO scheme includes a BS 210, and a plurality of UEs, e.g., N UEs, e.g., two UEs, e.g., a UE#1 220 and a UE#2 230. The BS 210 includes a plurality of Tx antennas, e.g., M Tx antennas, e.g., two Tx antennas, e.g., a Tx antenna#1 211-1 and a Tx antenna#2 211-2.

In a case that a mmWave beamforming scheme is used in a signal transmitting apparatus or a signal transmitting/receiving apparatus, a beam sweeping process is performed for Tx beams of various directions as illustrated in FIG. 2 for detecting an optimal TX antenna and an optimal Tx beam.

It will be assumed that the UE#1 220 receives data corresponding to one of Tx beam patterns provided in the Tx antennal#2 211-2, and the UE#2 230 receives data corresponding to one of Tx beam patterns provided in the Tx antennal#1 211-1, according to the beam sweeping process. In this case, the Tx beam patterns provided in the Tx antennal#1 211-1 act as interference for the UE#1 220 (240), and the Tx beam patterns provided in the Tx antennal#2 111-2 act as interference for the UE#2 230 (250).

The UE#1 220 determines to receive data corresponding to one of the Tx beam patterns provided in the Tx antenna#2 211-2, that is, the UE#1 220 selects the Tx antenna#2 211-2 as an optimal Tx antenna, and selects one of the Tx beam patterns provided in the Tx antenna#2 211-2 as an optimal Tx beam. Therefore, the UE#1 220 transmits feedback information that the optimal Tx beam pattern is set as one of Tx beam patterns provided in the Tx antenna#2 211-2 (260). The feedback information transmitted from the UE#1 220 to the BS 210 includes an optimal Tx beam pattern index, and it will be assumed that the optimal Tx beam pattern index is one of Tx beam pattern indexes provided in the Tx antenna#2 211-2, e.g., TxBI2.

The UE#2 230 determines to receive data corresponding to one of the Tx beam patterns provided in the Tx antenna#1 211-1, that is, the UE#2 230 selects the Tx antenna#1 211-1 as an optimal Tx antenna, and selects one of the Tx beam patterns provided in the Tx antenna#1 211-1 as an optimal Tx beam. Therefore, the UE#2 230 transmits feedback information that the optimal Tx beam pattern is set as one of Tx beam patterns provided in the Tx antenna#1 211-1 (270). The feedback information transmitted from the UE#2 230 to the BS 210 includes an optimal Tx beam pattern index, and it will be assumed that the optimal Tx beam pattern index is one of Tx beam pattern indexes provided in the Tx antenna#1 211-1, e.g., TxBI1.

As described in Equation 1, an effective SINR required for a UE to determine a CQI may be detected correctly if the UE knows interference strength correctly. Therefore, in an embodiment of the present disclosure, a BS transmits an optimal Tx beam pattern index included in feedback information received from a UE to remaining UEs except for the UE.

For example, in FIG. 2, the BS 210 feeds forward the optimal Tx beam pattern index received from the UE#1 220 to remaining UEs except for the UE#1 220 among UEs to which the BS 210 provides a service, e.g., the UE#2 230 (280).

After receiving the optimal Tx beam pattern index that the BS 210 receives from the UE#1 220 from the BS 210, the UE#2 230 determines an effective SINR as described in Equation 1 by setting strength which corresponds to the optimal Tx beam pattern index received from the UE#1 220, i.e., TxBI2 as interference strength PI.

For example, in FIG. 2, the BS 210 feeds forward the optimal Tx beam pattern received from the UE#2 230 to remaining UEs except for the UE#2 230 among UEs to which the BS 210 provides a service, e.g., the UE#1 220 (290).

After receiving the optimal Tx beam pattern index that the BS 210 receives from the UE#2 230 from the BS 210, the UE#1 220 determines an effective SINR as described in Equation 1 by setting strength which corresponds to the optimal Tx beam pattern index received from the UE#2 130, e.g., TxBI1 as interference strength PI.

In an embodiment of the present disclosure, it will be assumed that a timing point at which an optimal Tx beam pattern index is transmitted is identical to a timing point at which a UE transmits a CQI.

Alternatively, the optimal Tx beam pattern index may be transmitted at a timing point different from a timing point at which the CQI is transmitted. A detailed description of the timing point at which the CQI is transmitted will be omitted herein.

In an embodiment of the present disclosure, it will be assumed that a message through which a UE transmits an optimal Tx beam pattern index is identical to a message through which the UE transmits a CQI.

Alternatively, the optimal Tx beam pattern index may be transmitted through a message different from the message through which the CQI is transmitted. A detailed description of the message used for transmitting the optimal Tx beam pattern index will be omitted herein.

In an embodiment of the present disclosure, a period by which a CQI and an optimal Tx beam pattern index are transmitted may be variable. In an embodiment of the present disclosure, the period by which the CQI and the optimal Tx beam pattern index are transmitted may be determined as a period during which channel status is static.

By means of the cross-forwarding process, a UE may know optimal Tx beam indexes for UEs other than the UE, and detect strength of a signal which corresponds to the optimal Tx beam indexes for the UEs other than the UE as interference strength. The UE may detect interference strength correctly, so the UE may detect an effective SINR correctly and detect a CQI correctly.

Another example of a cross-forwarding process in a case that a mmWave beamforming scheme is used in a communication system supporting a MU-MIMO scheme according to an embodiment of the present disclosure has been described with reference to FIG. 2, and still another example of a cross-forwarding process in a case that a mmWave beamforming scheme is used in a communication system supporting a MU-MIMO scheme according to an embodiment of the present disclosure will be described with reference to FIG. 3.

Figure 3:
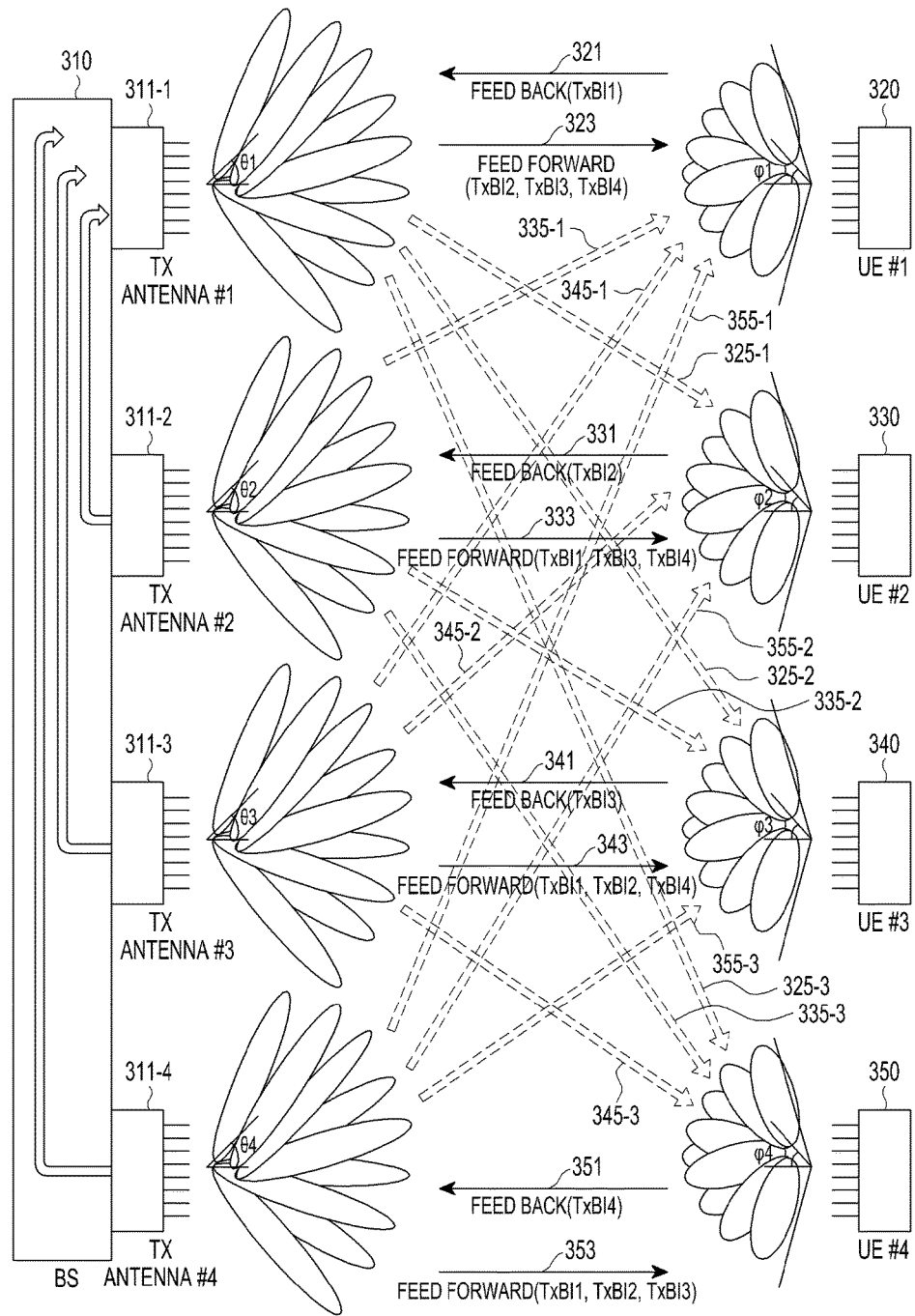
FIG. 3 schematically illustrates still another example of a cross-forwarding process in a case that a mmWave beamforming scheme is used in a communication system supporting a MU-MIMO scheme according to an embodiment of the present disclosure.

FIG. 3 schematically illustrates still another example of a cross-forwarding process in a case that a mmWave beamforming scheme is used in a communication system supporting a MU-MIMO scheme according to an embodiment of the present disclosure.

Referring to FIG. 3, a communication system supporting a MU-MIMO scheme includes a BS 310, and a plurality of UEs, e.g., N UEs, e.g., four UEs, e.g., a UE#1 320, a UE#2 330, a UE#3 340, and a UE#4 350. The BS 310 includes a plurality of Tx antennas, e.g., M Tx antennas, e.g., four antennas, e.g., a Tx antenna#1 311-1, a Tx antenna#2 311-2, a Tx antenna#3 311-3, and a Tx antenna#4 311-4.

In a case that a mmWave beamforming scheme is used in a signal transmitting apparatus or a signal transmitting/receiving apparatus, a beam sweeping process is performed for Tx beams of various directions as illustrated in FIG. 3 for detecting an optimal TX antenna and an optimal Tx beam.

It will be assumed that the UE#1 320 receives data corresponding to one of Tx beam patterns provided in the Tx antenna#1 311-1, the UE#2 330 receives data corresponding to one of Tx beam patterns provided in the Tx antenna#2 311-2, the UE#3 340 receives data corresponding to one of Tx beam patterns provided in the Tx antenna#3 311-3, and the UE#4 350 receives data corresponding to one of Tx beam patterns provided in the Tx antenna#4 311-4, according to the beam sweeping process.

In this case, the Tx beam patterns provided in the Tx antenna#1 311-1 act as interference for each of the UE#2 330, the UE#3 340, and the UE#4 350(325-1, 325-2, 325-3), the Tx beam patterns provided in the Tx antenna#2 311-2 act as interference for each of the UE#1 320, the UE#3 340, and the UE#4 350(335-1, 335-2, 335-3), the Tx beam patterns provided in the Tx antenna#3 311-3 act as interference for each of the UE#1 320, the UE#2 330, and the UE#4 350(345-1, 345-2, 345-3), and the Tx beam patterns provided in the Tx antenna#4 311-4 act as interference for each of the UE#1 320, the UE#2 330, and the UE#3 340(355-1, 355-2, 355-3).

The UE#1 320 determines to receive data corresponding to one of the Tx beam patterns provided in the Tx antenna#1 311-1, that is, the UE#1 320 selects the Tx antenna#1 311-1 as an optimal Tx antenna, and selects one of the Tx beam patterns provided in the Tx antenna#1 311-1 as an optimal Tx beam. Therefore, the UE#1 320 transmits feedback information that the optimal Tx beam pattern is set as one of Tx beam patterns provided in the Tx antenna#1 311-1 (321). The feedback information transmitted from the UE#1 320 to the BS 310 includes an optimal Tx beam pattern index, and it will be assumed that the optimal Tx beam pattern index is one of Tx beam pattern indexes provided in the Tx antenna#1 311-1, e.g., TxBI1.

The UE#2 330 determines to receive data corresponding to one of the Tx beam patterns provided in the Tx antenna#2 311-2, that is, the UE#2 330 selects the Tx antenna#2 311-2 as an optimal Tx antenna, and selects one of the Tx beam patterns provided in the Tx antenna#2 311-2 as an optimal Tx beam. Therefore, the UE#2 330 transmits feedback information that the optimal Tx beam pattern is set as one of Tx beam patterns provided in the Tx antenna#2 311-2 (331). The feedback information transmitted from the UE#2 330 to the BS 310 includes an optimal Tx beam pattern index, and it will be assumed that the optimal Tx beam pattern index is one of Tx beam pattern indexes provided in the Tx antenna#2 311-2, e.g., TxBI2.

The UE#3 340 determines to receive data corresponding to one of the Tx beam patterns provided in the Tx antenna#3 311-3, that is, the UE#3 340 selects the Tx antenna#3 311-3 as an optimal Tx antenna, and selects one of the Tx beam patterns provided in the Tx antenna#3 311-3 as an optimal Tx beam. Therefore, the UE#3 340 transmits feedback information that the optimal Tx beam pattern is set as one of Tx beam patterns provided in the Tx antenna#3 311-3 (341). The feedback information transmitted from the UE#3 340 to the BS 310 includes an optimal Tx beam pattern index, and it will be assumed that the optimal Tx beam pattern index is one of Tx beam pattern indexes provided in the Tx antenna#3 311-3, e.g., TxBI3.

The UE#4 350 determines to receive data corresponding to one of the Tx beam patterns provided in the Tx antenna#4

311-4, that is, the UE#4 350 selects the Tx antenna#4 311-4 as an optimal Tx antenna, and selects one of the Tx beam patterns provided in the Tx antenna#4 311-4 as an optimal Tx beam. Therefore, the UE#4 350 transmits feedback information that the optimal Tx beam pattern is set as one of Tx beam patterns provided in the Tx antenna#4 311-4 (351). The feedback information transmitted from the UE#4 350 to the BS 310 includes an optimal Tx beam pattern index, and it will be assumed that the optimal Tx beam pattern index is one of Tx beam pattern indexes provided in the Tx antenna#4 311-4, e.g., TxBI4.

As described in Equation 1, an effective SINR required for a UE to determine a CQI may be detected correctly if the UE knows interference strength correctly. Therefore, in an embodiment of the present disclosure, a BS transmits an optimal Tx beam pattern index included in feedback information received from a UE to remaining UEs except for the UE.

For example, in FIG. 3, the BS 310 feeds forward the optimal Tx beam pattern index received from the UE#1 320 to remaining UEs except for the UE#1 320 among UEs to which the BS 310 provides a service, e.g., the UE#2 330, the UE#3 340, and the UE#4 350 (333, 343, 353).

The BS 310 feeds forward the optimal Tx beam pattern index received from the UE#2 330 to remaining UEs except for the UE#2 330 among UEs to which the BS 310 provides a service, e.g., the UE#1 320, the UE#3 340, and the UE#4 350 (323, 343, 353).

The BS 310 feeds forward the optimal Tx beam pattern index received from the UE#3 340 to remaining UEs except for the UE#3 340 among UEs to which the BS 310 provides a service, e.g., the UE#1 320, the UE#2 330, and the UE#4 350 (323, 333, 353).

The BS 310 feeds forward the optimal Tx beam pattern index received from the UE#4 350 to remaining UEs except for the UE#4 350 among UEs to which the BS 310 provides a service, e.g., the UE#1 320, the UE#2 330, and the UE#3 340 (323, 333, 343).

As a result, the BS 310 transmits an optimal Tx beam index received from each of the UE#2 330, the UE#3 340, and the UE#4 350, i.e., TxBI2, TxBI3, and TxBI4 to the UE#1 320 (323).

The BS 310 transmits an optimal Tx beam index received from each of the UE#1 320, the UE#3 340, and the UE#4 350, i.e., TxBI1, TxBI3, and TxBI4 to the UE#2 330 (333).

The BS 310 transmits an optimal Tx beam index received from each of the UE#1 320, the UE#2 330, and the UE#4 350, i.e., TxBI1, TxBI2, and TxBI4 to the UE#3 340 (343).

The BS 310 transmits an optimal Tx beam index received from each of the UE#1 320, the UE#2 330, and the UE#3 340, i.e., TxBI1, TxBI2, and TxBI3 to the UE#4 350 (353).

After receiving the optimal Tx beam pattern index that the BS 310 receives from each of the UE#2 330, the UE#3 340, and the UE#4 350 from the BS 310, the UE#1 320 determines an effective SINR as described in Equation 1 by setting strength which corresponds to the optimal Tx beam pattern indexes received from the UE#2 330, the UE#3 340, and the UE#4 350, i.e., TxBI2, TxBI3, and TxBI4 as interference strength PI.

After receiving the optimal Tx beam pattern index that the BS 310 receives from each of the UE#1 320, the UE#3 340, and the UE#4 350 from the BS 310, the UE#2 330 determines an effective SINR as described in Equation 1 by setting strength which corresponds to the optimal Tx beam pattern indexes received from the UE#1 320, the UE#3 340, and the UE#4 350, i.e., TxBI1, TxBI3, and TxBI4 as interference strength PI.

After receiving the optimal Tx beam pattern index that the BS 310 receives from each of the UE#1 320, the UE#2 330, and the UE#4 350 from the BS 310, the UE#3 340 determines an effective SINR as described in Equation 1 by setting strength which corresponds to the optimal Tx beam pattern indexes received from the UE#1 320, the UE#2 330, and the UE#4 350, i.e., TxBI1, TxBI2, and TxBI4 as interference strength PI.

After receiving the optimal Tx beam pattern index that the BS 310 receives from each of the UE#1 320, the UE#2 330, and the UE#3 340 from the BS 310, the UE#4 350 determines an effective SINR as described in Equation 1 by setting strength which corresponds to the optimal Tx beam pattern indexes received from the UE#1 320, the UE#2 330, and the UE#3 340, i.e., TxBI1, TxBI2, and TxBI3 as interference strength PI.

In an embodiment of the present disclosure, it will be assumed that a timing point at which an optimal Tx beam pattern index is transmitted is identical to a timing point at which a UE transmits a CQI.

Alternatively, the optimal Tx beam pattern index may be transmitted at a timing point different from a timing point at which the CQI is transmitted. A detailed description of the timing point at which the CQI is transmitted will be omitted herein.

In an embodiment of the present disclosure, it will be assumed that a message with which a UE transmits an optimal Tx beam pattern index is identical to a message with which the UE transmits a CQI.

Alternatively, the optimal Tx beam pattern index may be transmitted through a message different from the message through which the CQI is transmitted. A detailed description of the message used for transmitting the optimal Tx beam pattern index will be omitted herein.

In an embodiment of the present disclosure, a period by which a CQI and an optimal Tx beam pattern index are transmitted may be variable. In an embodiment of the present disclosure, the period by which the CQI and the optimal Tx beam pattern index are transmitted may be determined as a period during which channel status is static.

By means of the cross-forwarding process, a UE may know optimal Tx beam indexes for UEs other than the UE, and detect strength of a signal which corresponds to the optimal Tx beam indexes for the UEs as interference strength. The UE may detect interference strength correctly, so the UE may detect an effective SINR correctly and detect a CQI correctly.

Still another example of a cross-forwarding process in a case that a mmWave beamforming scheme is used in a communication system supporting a MU-MIMO scheme according to an embodiment of the present disclosure has been described with reference to FIG. 3, and an example of an operating process of a BS in a communication system supporting a MU-MIMO scheme according to an embodiment of the present disclosure will be described with reference to FIG. 4.

Figure 4:
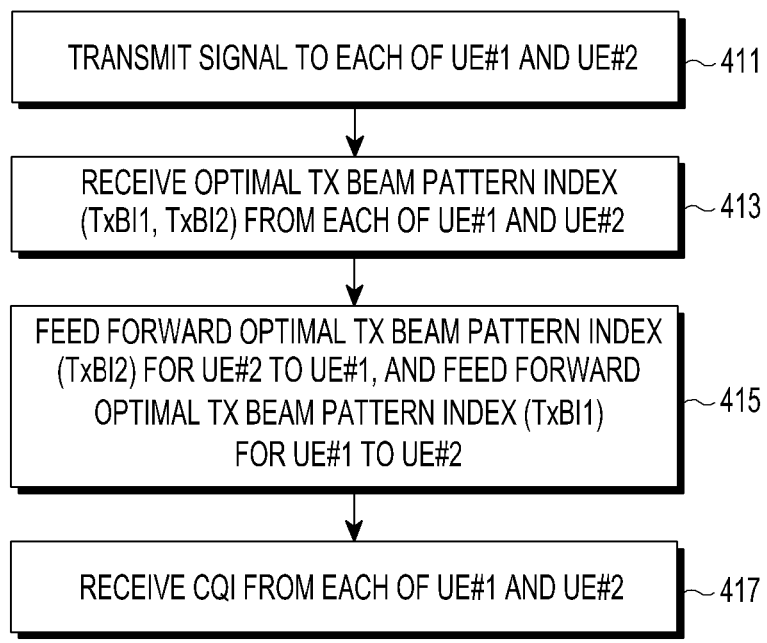
FIG. 4 schematically illustrates an example of an operating process of a base station (BS) in a communication system supporting a MU-MIMO scheme according to an embodiment of the present disclosure.

FIG. 4 schematically illustrates an example of an operating process of a BS in a communication system supporting a MU-MIMO scheme according to an embodiment of the present disclosure.

Referring to FIG. 4, for example, it will be assumed that an operating process of a BS in FIG. 4 is an operating process of a BS according to a cross-forwarding process described in FIG. 1. That is, it will be assumed that an operating process of a BS in FIG. 4 is an operating process of a BS according to a cross-forwarding process in a case that a BS uses two Tx antennas, e.g., a Tx antenna#1 and a Tx antenna#2 and provides a service to two UEs, e.g., a UE#1 and a UE#2.

A BS transmits a signal to a UE#1 corresponding to a preset optimal Tx beam index at a preset timing point T1 and transmits a signal to a UE#2 corresponding to a preset optimal Tx beam index at the timing point T1 at operation 411. For example, the timing point T1 may be a scheduling timing point.

The BS receives an optimal Tx beam index from each of the UE#1 and the UE#2 at operation 413. Here, it will be assumed that the UE#1 fed back TxBI1 as an optimal Tx beam index and the UE#2 fed back TxBI2 as an optimal Tx beam index.

The BS feeds forward the optimal Tx beam index TxBI1 received from the UE#1 to the UE#2 thereby the UE#2 detects a correct effective SINR to feed back a correct CQI to the BS at operation 415. Further, the BS feeds forward the optimal Tx beam index TxBI2 received from the UE#2 to the UE#1 thereby the UE#1 detects a correct effective SINR to feed back a correct CQI to the BS at operation 415.

The BS receives a CQI from each of the UE#1 and the UE#2 at operation 417. The CQI received from the UE1 is a CQI that the UE#1 determines by considering interference strength for remaining UEs other than the UE#1 correctly, and the CQI received from the UE2 is a CQI that the UE#2 determines by considering interference strength for remaining UEs other than the UE#2 correctly.

Although FIG. 4 illustrates an example of an operating process of a BS in a communication system supporting a MU-MIMO scheme according to an embodiment of the present disclosure, various changes could be made to FIG. 4. For example, although shown as a series of operations, various operations in FIG. 4 could overlap, occur in parallel, occur in a different order, or occur multiple times.

An example of an operating process of a BS in a communication system supporting a MU-MIMO scheme according to an embodiment of the present disclosure has been described with reference to FIG. 4, and an example of an operating process of a UE in a communication system supporting a MU-MIMO scheme according to an embodiment of the present disclosure will be described with reference to FIG. 5.

Figure 5:
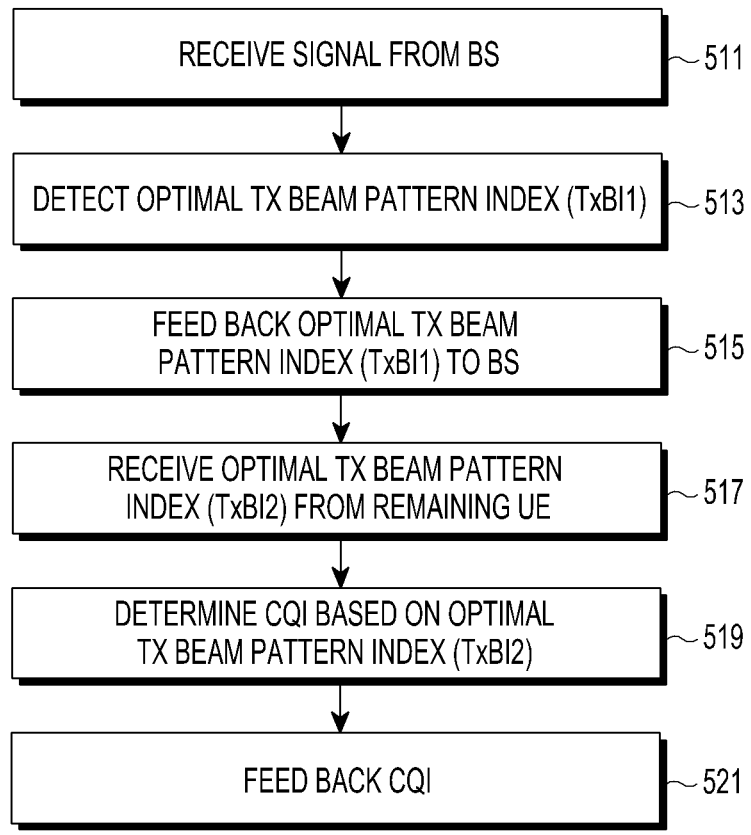
FIG. 5 schematically illustrates an example of an operating process of a user equipment (UE) in a communication system supporting a MU-MIMO scheme according to an embodiment of the present disclosure.

FIG. 5 schematically illustrates an example of an operating process of a UE in a communication system supporting a MU-MIMO scheme according to an embodiment of the present disclosure.

Referring to FIG. 5, for example, it will be assumed that an operating process of a UE in FIG. 5 is an operating process of a UE according to a cross-forwarding process described in FIG. 1. That is, it will be assumed that an operating process of a UE in FIG. 5 is an operating process of a UE#1 according to a cross-forwarding process in a case that a BS uses two Tx antennas, e.g., a Tx antenna#1 and a Tx antenna#2 and provides a service to two UEs, e.g., the UE#1 and a UE#2.

The UE#1 receives a signal from a BS at a preset timing point T1 at operation 511. The UE#1 performs a beam sweeping process on the signal received from the BS to detect an optimal Tx beam pattern index at operation 513. Here, it will be assumed that the UE#1 detects TxBI1 as an optimal Tx beam pattern index.

The UE#1 feeds back the detected optimal Tx beam pattern index TxBI1 to the BS at operation 515. The UE#1 receives an optimal Tx beam pattern index transmitted by a remaining UE other than the UE#1, e.g., the UE#2 from the BS at operation 517.

The UE#1 detects a correct effective SINR by detecting interference strength PI based on the optimal Tx beam pattern index transmitted by the UE#2 which is received from the BS and determines a correct CQI based on the correct effective SINR at operation 519.

The UE#1 feeds back the determined CQI to the BS at operation 521.

Although FIG. 5 illustrates an example of an operating process of a UE in a communication system supporting a MU-MIMO scheme according to an embodiment of the present disclosure, various changes could be made to FIG. 5. For example, although shown as a series of operations, various operations in FIG. 5 could overlap, occur in parallel, occur in a different order, or occur multiple times.

An example of an operating process of a UE in a communication system supporting a MU-MIMO scheme according to an embodiment of the present disclosure has been described with reference to FIG. 5, and another example of an operating process of a BS in a communication system supporting a MU-MIMO scheme according to an embodiment of the present disclosure will be described with reference to FIG. 6.

Figure 6:
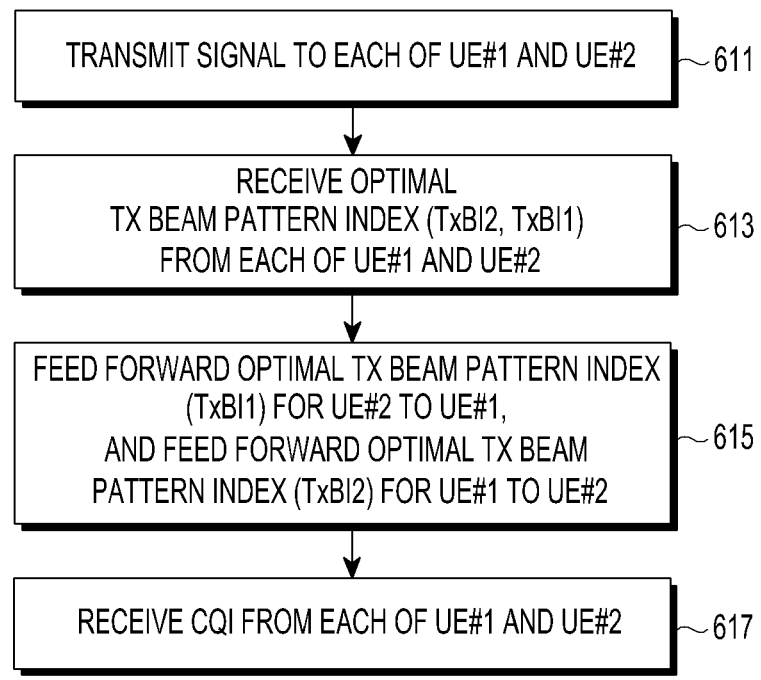
FIG. 6 schematically illustrates another example of an operating process of a BS in a communication system supporting a MU-MIMO scheme according to an embodiment of the present disclosure.

FIG. 6 schematically illustrates another example of an operating process of a BS in a communication system supporting a MU-MIMO scheme according to an embodiment of the present disclosure.

Referring to FIG. 6, for example, it will be assumed that an operating process of a BS in FIG. 6 is an operating process of a BS according to a cross-forwarding process described in FIG. 2. That is, it will be assumed that an operating process of a BS in FIG. 6 is an operating process of a BS according to a cross-forwarding process in a case that a BS uses two Tx antennas, e.g., a Tx antenna#1 and a Tx antenna#2 and provides a service to two UEs, e.g., a UE#1 and a UE#2.

A BS transmits a signal to a UE#1 corresponding to a preset optimal Tx beam index at a preset timing point T1 and transmits a signal to a UE#2 corresponding to a preset optimal Tx beam index at the timing point T1 at operation 611. For example, the timing point T1 may be a scheduling timing point.

The BS receives an optimal Tx beam index from each of the UE#1 and the UE#2 at operation 613. Here, it will be assumed that the UE#1 fed back TxBI2 as an optimal Tx beam index and the UE#2 fed back TxBI1 as an optimal Tx beam index.

The BS feeds forward the optimal Tx beam index TxBI2 received from the UE#1 to the UE#2 thereby the UE#2 detects a correct effective SINR to feed back a correct CQI to the BS at operation 615. Further, the BS feeds forward the optimal Tx beam index TxBI1 received from the UE#2 to the UE#1 thereby the UE#1 detects a correct effective SINR to feed back a correct CQI to the BS at operation 615.

The BS receives a CQI from each of the UE#1 and the UE#2 at operation 617. The CQI received from the UE1 is a CQI that the UE#1 determines by considering interference strength for remaining UEs other than the UE#1 correctly, and the CQI received from the UE2 is a CQI that the UE#2 determines by considering interference strength for remaining UEs other than the UE#2 correctly.

Although FIG. 6 illustrates another example of an operating process of a BS in a communication system supporting a MU-MIMO scheme according to an embodiment of the present disclosure, various changes could be made to FIG. 6. For example, although shown as a series of operations, various operations in FIG. 6 could overlap, occur in parallel, occur in a different order, or occur multiple times.

Another example of an operating process of a BS in a communication system supporting a MU-MIMO scheme according to an embodiment of the present disclosure has been described with reference to FIG. 6, and another example of an operating process of a UE in a communication system supporting a MU-MIMO scheme according to an embodiment of the present disclosure will be described with reference to FIG. 7.

Figure 7:
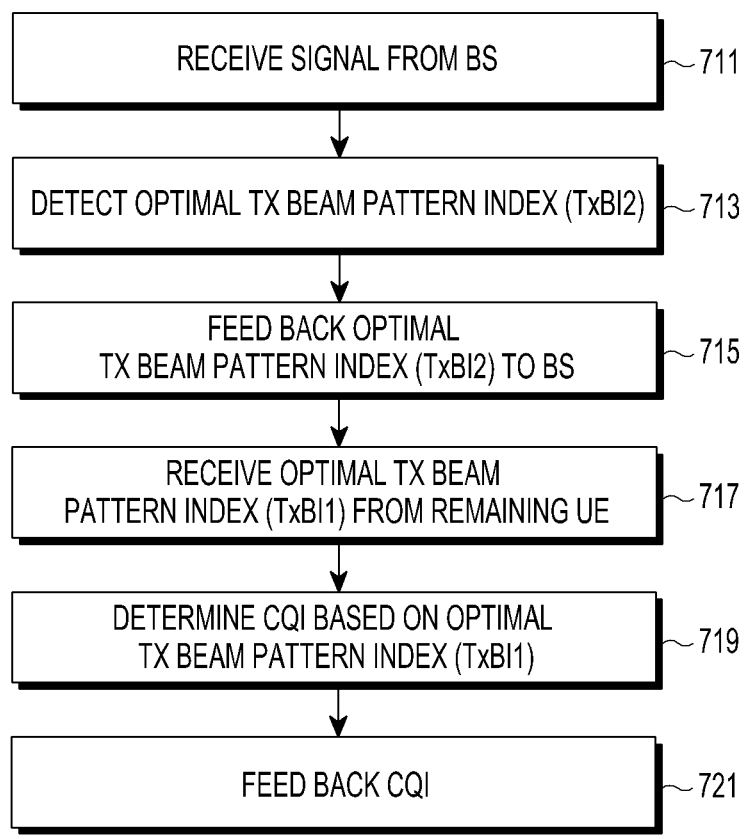
FIG. 7 schematically illustrates another example of an operating process of a UE in a communication system supporting a MU-MIMO scheme according to an embodiment of the present disclosure.

FIG. 7 schematically illustrates another example of an operating process of a UE in a communication system supporting a MU-MIMO scheme according to an embodiment of the present disclosure.

Referring to FIG. 7, for example, it will be assumed that an operating process of a UE in FIG. 7 is an operating process of a UE according to a cross-forwarding process described in FIG. 2. That is, it will be assumed that an operating process of a UE in FIG. 7 is an operating process of a UE#1 according to a cross-forwarding process in a case that a BS uses two Tx antennas, e.g., a Tx antenna#1 and a Tx antenna#2 and provides a service to two UEs, e.g., the UE#1 and a UE#2.

The UE#1 receives a signal from a BS at a preset timing point T1 at operation 711. The UE#1 performs a beam sweeping process on the signal received from the BS to detect an optimal Tx beam pattern index at operation 713. Here, it will be assumed that the UE#1 detects TxBI2 as an optimal Tx beam pattern index.

The UE#1 feeds back the detected optimal Tx beam pattern index TxBI2 to the BS at operation 715. The UE#1 receives an optimal Tx beam pattern index transmitted by a remaining UE other than the UE#1, e.g., the UE#2 from the BS at operation 717.

The UE#1 detects a correct effective SINR by detecting interference strength PI based on the optimal Tx beam pattern index transmitted by the UE#2 which is received from the BS and determines a correct CQI based on the correct effective SINR at operation 719.

The UE#1 feeds back the determined CQI to the BS at operation 721.

Although FIG. 7 illustrates another example of an operating process of a UE in a communication system supporting a MU-MIMO scheme according to an embodiment of the present disclosure, various changes could be made to FIG. 7. For example, although shown as a series of operations, various operations in FIG. 7 could overlap, occur in parallel, occur in a different order, or occur multiple times.

Another example of an operating process of a UE in a communication system supporting a MU-MIMO scheme according to an embodiment of the present disclosure has been described with reference to FIG. 7, and still another example of an operating process of a BS in a communication system supporting a MU-MIMO scheme according to an embodiment of the present disclosure will be described with reference to FIG. 8.

Figure 8:
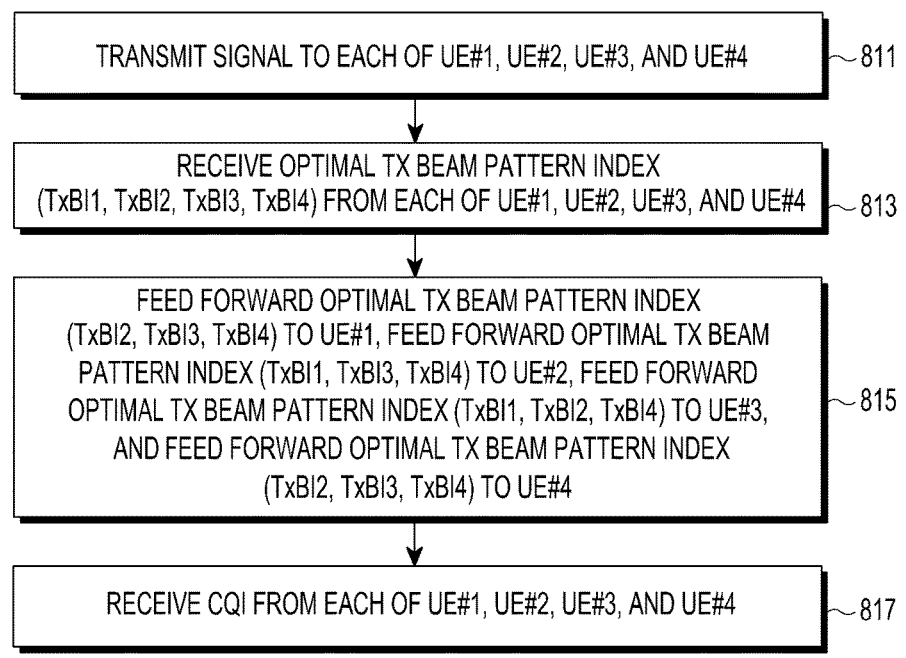
FIG. 8 schematically illustrates still another example of an operating process of a BS in a communication system supporting a MU-MIMO scheme according to an embodiment of the present disclosure.

FIG. 8 schematically illustrates still another example of an operating process of a BS in a communication system supporting a MU-MIMO scheme according to an embodiment of the present disclosure.

Referring to FIG. 8, for example, it will be assumed that an operating process of a BS in FIG. 8 is an operating process of a BS according to a cross-forwarding process described in FIG. 3. That is, it will be assumed that an operating process of a BS in FIG. 8 is an operating process of a BS according to a cross-forwarding process in a case that a BS uses four Tx antennas, e.g., a Tx antenna#1, a Tx antenna#2, a Tx antenna#3, and a Tx antenna#4, and provides a service to four UEs, e.g., a UE#1, a UE#2, a UE#3, and a UE#4.

A BS transmits a signal to a UE#1 corresponding to a preset optimal Tx beam index at a preset timing point T1, transmits a signal to a UE#2 corresponding to a preset optimal Tx beam index at the timing point T1, transmits a signal to a UE#3 corresponding to a preset optimal Tx beam index at the timing point T1, and transmits a signal to a UE#4 corresponding to a preset optimal Tx beam index at the timing point T1 at operation 811. For example, the timing point T1 may be a scheduling timing point.

The BS receives an optimal Tx beam index from each of the UE#1, the UE#2, the UE#3, and the UE#4 at operation 813. Here, it will be assumed that the UE#1 fed back TxBI1 as an optimal Tx beam index, the UE#2 fed back TxBI2 as an optimal Tx beam index, the UE#3 fed back TxBI3 as an optimal Tx beam index, and the UE#4 fed back TxBI4 as an optimal Tx beam index.

The BS feeds forward the optimal Tx beam index TxBI1 received from the UE#1 to each of the UE#2, the UE#3, and the UE#4 thereby each of the UE#2, the UE#3, and the UE#4 detects a correct effective SINR to feed back a correct CQI to the BS at operation 815.

The BS feeds forward the optimal Tx beam index TxBI2 received from the UE#2 to each of the UE#1, the UE#3, and the UE#4 thereby each of the UE#1, the UE#3, and the UE#4 detects a correct effective SINR to feed back a correct CQI to the BS at operation 815.

The BS feeds forward the optimal Tx beam index TxBI3 received from the UE#3 to each of the UE#1, the UE#2, and the UE#4 thereby each of the UE#1, the UE#2, and the UE#4 detects a correct effective SINR to feed back a correct CQI to the BS at operation 815.

The BS feeds forward the optimal Tx beam index TxBI4 received from the UE#4 to each of the UE#1, the UE#2, and the UE#3 thereby each of the UE#1, the UE#2, and the UE#3 detects a correct effective SINR to feed back a correct CQI to the BS at operation 815.

The BS receives a CQI from each of the UE#1, the UE#2, the UE#3, and the UE#4 at operation 817. The CQI received from the UE1 is a CQI that the UE#1 determines by considering interference strength for remaining UEs other than the UE#1 correctly, the CQI received from the UE2 is a CQI that the UE#2 determines by considering interference strength for remaining UEs other than the UE#2 correctly, the CQI received from the UE3 is a CQI that the UE#3 determines by considering interference strength for remaining UEs other than the UE#3 correctly, and the CQI received from the UE4 is a CQI that the UE#4 determines by considering interference strength for remaining UEs other than the UE#4 correctly.

Although FIG. 8 illustrates still another example of an operating process of a BS in a communication system supporting a MU-MIMO scheme according to an embodiment of the present disclosure, various changes could be made to FIG. 8. For example, although shown as a series of operations, various operations in FIG. 8 could overlap, occur in parallel, occur in a different order, or occur multiple times.

Still another example of an operating process of a BS in a communication system supporting a MU-MIMO scheme according to an embodiment of the present disclosure has been described with reference to FIG. 8, and still another example of an operating process of a UE in a communication system supporting a MU-MIMO scheme according to an embodiment of the present disclosure will be described with reference to FIG. 9.

Figure 9:
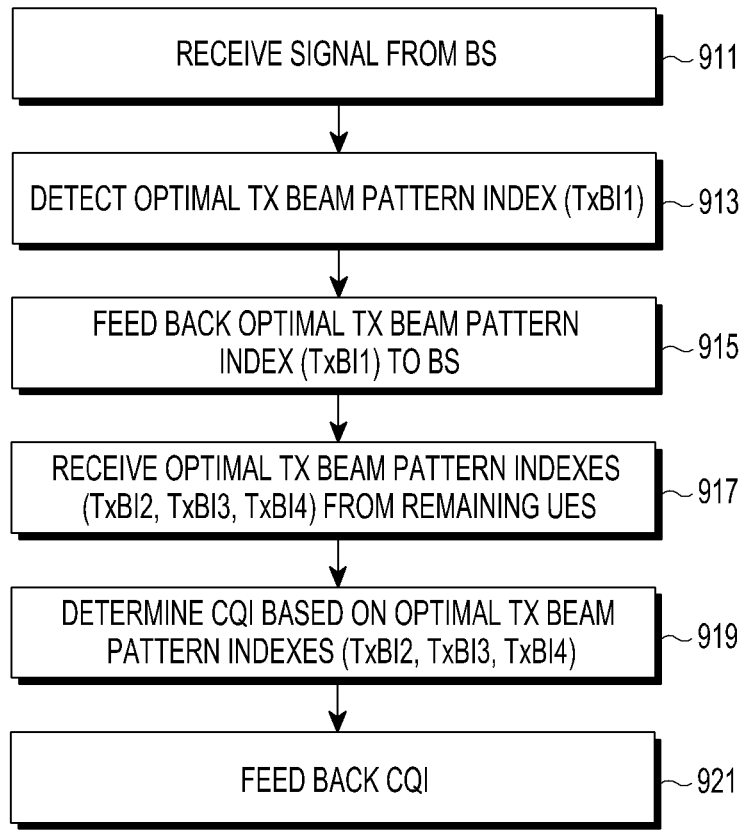
FIG. 9 schematically illustrates still another example of an operating process of a UE in a communication system supporting a MU-MIMO scheme according to an embodiment of the present disclosure.

FIG. 9 schematically illustrates still another example of an operating process of a UE in a communication system supporting a MU-MIMO scheme according to an embodiment of the present disclosure.

Referring to FIG. 9, for example, it will be assumed that an operating process of a UE in FIG. 9 is an operating process of a UE according to a cross-forwarding process described in FIG. 3. That is, it will be assumed that an operating process of a UE in FIG. 9 is an operating process of a UE according to a cross-forwarding process in a case that a BS uses four Tx antennas, e.g., a Tx antenna#1, a Tx antenna#2, a Tx antenna#3, and a Tx antenna#4, and provides a service to four UEs, e.g., a UE#1, a UE#2, a UE#3, and a UE#4.

The UE#1 receives a signal from a BS at a preset timing point T1 at operation 911. The UE#1 performs a beam sweeping process on the signal received from the BS to detect an optimal Tx beam pattern index at operation 913. Here, it will be assumed that the UE#1 detects TxBI1 as an optimal Tx beam pattern index.

The UE#1 feeds back the detected optimal Tx beam pattern index TxBI1 to the BS at operation 915. The UE#1 receives optimal Tx beam pattern indexes transmitted by remaining UEs other than the UE#1, e.g., the UE#2, the UE#3, and the UE#4 from the BS at operation 917.

The UE#1 detects a correct effective SINR by detecting interference strength PI based on the optimal Tx beam pattern indexes transmitted by the UE#2, the UE#3, and the UE#4 which are received from the BS and determines a correct CQI based on the correct effective SINR at operation 919.

The UE#1 feeds back the determined CQI to the BS at operation 921.

Although FIG. 9 illustrates still another example of an operating process of a UE in a communication system supporting a MU-MIMO scheme according to an embodiment of the present disclosure, various changes could be made to FIG. 9. For example, although shown as a series of operations, various operations in FIG. 9 could overlap, occur in parallel, occur in a different order, or occur multiple times.

Still another example of an operating process of a UE in a communication system supporting a MU-MIMO scheme according to an embodiment of the present disclosure has been described with reference to FIG. 9, and an inner structure of a BS in a communication system supporting a MU-MIMO scheme according to an embodiment of the present disclosure will be described with reference to FIG. 10.

Figure 10:
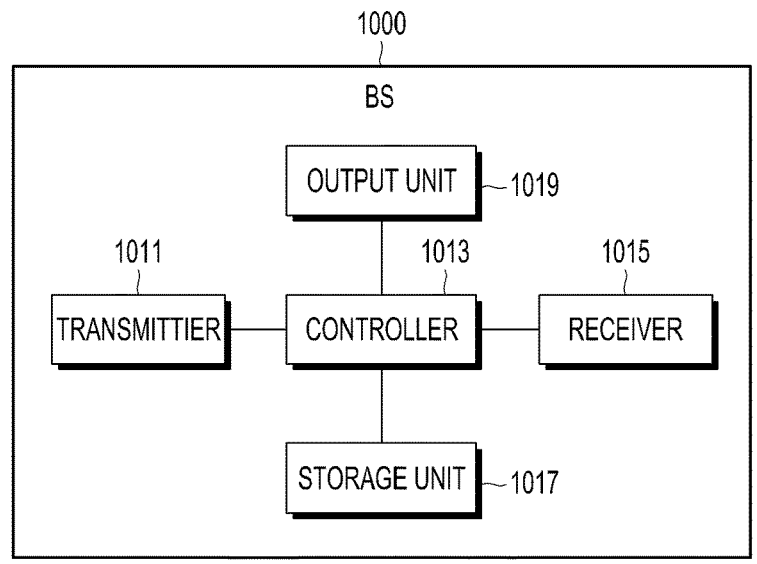
FIG. 10 schematically illustrates an inner structure of a BS in a communication system supporting a MU-MIMO scheme according to an embodiment of the present disclosure.

FIG. 10 schematically illustrates an inner structure of a BS in a communication system supporting a MU-MIMO scheme according to an embodiment of the present disclosure.

Referring to FIG. 10, a BS 1000 includes a transmitter 1011, a controller 1013, a receiver 1015, a storage unit 1017, and an output unit 1019.

The controller 1013 controls the overall operation of the BS 1000. More particularly, the controller 1013 controls an operation related to an operation of transmitting and receiving Tx beam information and channel quality information performed in a communication system supporting a MU-MIMO scheme according to an embodiment of the present disclosure. The operation related to the operation of transmitting and receiving the Tx beam information and the channel quality information performed in the communication system supporting the MU-MIMO scheme according to an embodiment of the present disclosure has been described with reference to FIGS. 1 to 9 and a detailed description thereof will be omitted herein.

The transmitter 1011 transmits various signals and various messages to other entities, e.g., a UE, and the like included in the communication system supporting the MU-MIMO scheme under a control of the controller 1013. The various signals and various messages transmitted in the transmitter 1011 have been described with reference to FIGS. 1 to 9 and a detailed description thereof will be omitted herein.

The receiver 1015 receives various signals and various messages from other entities, e.g., a UE, and the like included in the communication system supporting the MU-MIMO scheme under a control of the controller 1013. The various signals and various messages received in the receiver 1015 have been described with reference to FIGS. 1 to 9 and a detailed description thereof will be omitted herein.

The storage unit 1017 stores various programs, various data, and the like related to the operation of transmitting and receiving the Tx beam information and the channel quality information performed in the communication system supporting the MU-MIMO scheme according to an embodiment of the present disclosure under a control of the controller 1013.

The storage unit 1017 stores various signals and various messages which are received by the receiver 1015 from the other entities.

The output unit 1019 outputs various signals and various messages related to the operation of transmitting and receiving the Tx beam information and the channel quality information performed in the communication system supporting the MU-MIMO scheme according to an embodiment of the present disclosure which is performed in the BS 1000 under a control of the controller 1013. The various signals and various messages output by the output unit 1019 have been described with reference to FIGS. 1 to 9 and a detailed description thereof will be omitted herein.

While the transmitter 1011, the controller 1013, the receiver 1015, the storage unit 1017, and the output unit 1019 are described in the BS 1000 as separate units, it is to be understood that this is merely for convenience of description. In other words, two or more of the transmitter 1011, the controller 1013, the receiver 1015, the storage unit 1017, and the output unit 1019 may be incorporated into a single unit. The BS 1000 may be implemented with one processor.

An inner structure of a BS in a communication system supporting a MU-MIMO scheme according to an embodiment of the present disclosure has been described with reference to FIG. 10, and an inner structure of a UE in a communication system supporting a MU-MIMO scheme according to an embodiment of the present disclosure will be described with reference to FIG. 11.

Figure 11:
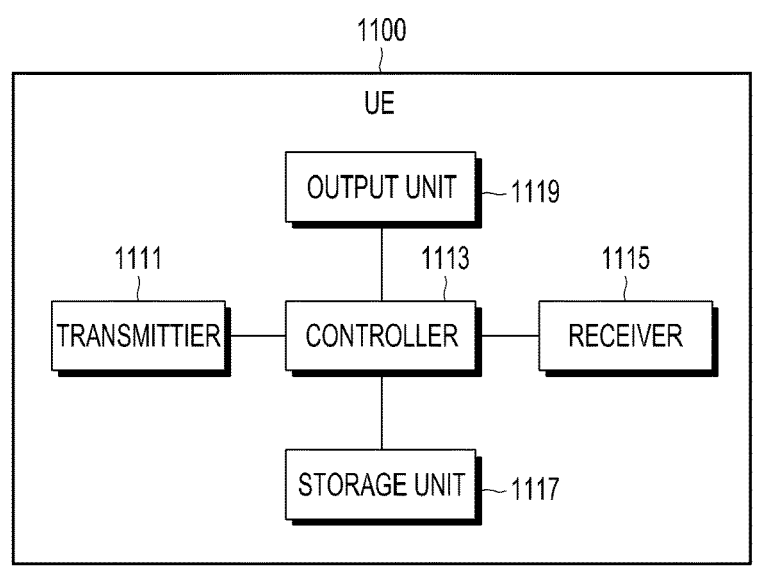
FIG. 11 schematically illustrates an inner structure of a UE in a communication system supporting a MU-MIMO scheme according to an embodiment of the present disclosure.

FIG. 11 schematically illustrates an inner structure of a UE in a communication system supporting a MU-MIMO scheme according to an embodiment of the present disclosure.

Referring to FIG. 11, a UE 1100 includes a transmitter 1111, a controller 1113, a receiver 1115, a storage unit 1117, and an output unit 1119.

The controller 1113 controls the overall operation of the UE 1100. More particularly, the controller 1113 controls an operation related to an operation of transmitting and receiving Tx beam information and channel quality information performed in a communication system supporting a MU-MIMO scheme according to an embodiment of the present disclosure. The operation related to the operation of transmitting and receiving the Tx beam information and the channel quality information performed in the communication system supporting the MU-MIMO scheme according to an embodiment of the present disclosure has been described with reference to FIGS. 1 to 9 and a detailed description thereof will be omitted herein.

The transmitter 1111 transmits various signals and various messages to other entities, e.g., a BS and the like included in the communication system supporting the MU-MIMO scheme under a control of the controller 1113. The various signals and various messages transmitted in the transmitter 1111 have been described with reference to FIGS. 1 to 9 and a detailed description thereof will be omitted herein.

The receiver 1115 receives various signals and various messages from other entities, e.g., a BS and the like included in the communication system supporting the MU-MIMO scheme under a control of the controller 1113. The various signals and various messages received in the receiver 1115 have been described with reference to FIGS. 1 to 9 and a detailed description thereof will be omitted herein.

The storage unit 1117 stores various programs, various data, and the like related to the operation of transmitting and receiving the Tx beam information and the channel quality information performed in the communication system supporting the MU-MIMO scheme according to an embodiment of the present disclosure under a control of the controller 1113.

The storage unit 1117 stores various signals and various messages which are received by the receiver 1115 from the other entities.

The output unit 1119 outputs various signals and various messages related to the operation of transmitting and receiving the Tx beam information and the channel quality information performed in the communication system supporting the MU-MIMO scheme according to an embodiment of the present disclosure which is performed in the UE 1100 under a control of the controller 1113. The various signals and various messages output by the output unit 1119 have been described with reference to FIGS. 1 to 9 and a detailed description thereof will be omitted herein.

While the transmitter 1111, the controller 1113, the receiver 1115, the storage unit 1117, and the output unit 1119 are described in the UE 1100 as separate units, it is to be understood that this is merely for convenience of description. In other words, two or more of the transmitter 1111, the controller 1113, the receiver 1115, the storage unit 1117, and the output unit 1119 may be incorporated into a single unit.

The UE 1100 may be implemented with one processor.

As is apparent from the foregoing description, an embodiment of the present disclosure enables transmission and reception of Tx beam information in a communication system supporting a MU-MIMO scheme.

An embodiment of the present disclosure enables transmission and reception of Tx beam information in a case that a mmWave beamforming scheme is used in a communication system supporting a MU-MIMO scheme.

An embodiment of the present disclosure enables to transmission and reception of channel quality information in a communication system supporting a MU-MIMO scheme.

An embodiment of the present disclosure enables to transmission and reception of channel quality information in a case that a mmWave scheme is used in a communication system supporting a MU-MIMO scheme.

An embodiment of the present disclosure enables generation of channel quality information by considering interference strength in a case that a mmWave scheme is used in a communication system supporting a MU-MIMO scheme.

An embodiment of the present disclosure enables generation of channel quality information based on Tx beam information for UEs other than a UE in a communication system supporting a MU-MIMO scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable read-only memory (ROM), a memory, for example, a random-access memory (RAM), a memory chip, a memory device, or a memory integrated circuit (IC), or an optically or magnetically recordable non-transitory machine-readable (e.g., computer-readable), storage medium (e.g., a compact disk (CD), a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving transmission beam (Tx beam) information by a first user equipment (UE) in a communication system supporting a multi-user multi-input multi-output (MU-MIMO) scheme, the method comprising:
   transmitting, to a base station (BS), first information on a first Tx beam selected by the first UE;
   receiving, from the BS, second information on a second Tx beam selected by at least one second UE; and
   transmitting, to the BS, channel quality information,
   wherein the channel quality information is determined based on a signal to interference and noise ratio (SINR) by using a strength of the second Tx beam as a strength of the interference.

2. The method of claim 1, further comprising:
   receiving a signal from the BS; and
   selecting the first Tx beam by performing a beam sweeping process on the signal.

3. The method of claim 1, wherein transmitting the first information on the first Tx beam comprises:
   transmitting the first information on the first Tx beam at a timing point,
   wherein the timing point is identical to a timing point at which the channel quality information is transmitted to the BS, or is different from a timing point at which the channel quality information is transmitted to the BS.

4. The method of claim 1, wherein transmitting the first information on the first Tx beam comprises:
   including the first information on the first Tx beam through to a message, wherein the message is identical to a message through which the channel quality information is transmitted or is different from a message through which the channel quality information is transmitted, and
   transmitting, to the BS, the message.

5. The method of claim 1, wherein transmitting the first information on the first Tx beam comprises:
   transmitting the first information on the first Tx beam by a period during which channel status is static.

6. A method for transmitting transmission beam (Tx beam) information by a base station (BS) in a communication system supporting a multi-user multi-input multi-output (MU-MIMO) scheme, the method comprising:
   receiving, from a first user equipment (UE), first information on a first Tx beam selected by the first UE;
   transmitting, to at least one second UE, the first information on the first Tx beam selected by the first UE; and
   receiving, from the at least one second UE, channel quality information,
   wherein the channel quality information is determined based on a signal to interference and noise ratio (SINR) by using a strength of the first Tx beam as a strength of the interference.

7. The method of claim 6, wherein receiving the first information on the first Tx beam comprises:
   receiving the first information on the first Tx beam at a timing point,
   wherein the timing point is identical to a timing point at which channel quality information of the first UE is received from the first UE, or is different from a timing point at which the channel quality information of the first UE is received from the first UE.

8. The method of claim 6, wherein receiving the first information on the first Tx beam comprises:
   receiving the first information on the first Tx beam through a message, wherein the message is identical to a message through which channel quality information of the first UE is received, or is different from a message through which the channel quality information of the first UE is received.

9. A first user equipment (UE) for receiving transmission beam (Tx beam) information in a communication system supporting a multi-user multi-input multi-output (MU-MIMO) scheme, the first UE comprising:
   a transmitter;
   a receiver; and
   a processor configured to:
      transmit, to a base station (BS), first information on a first Tx beam selected by the UE;
      receive, from the BS, second information on a second Tx beam selected by at least one second UE; and
      transmit, to the BS, the channel quality information,
   wherein the channel quality information is determined based on a signal to interference and noise ratio (SINR) by using a strength of the second Tx beam as a strength of the interference.

10. The first UE of claim 9, wherein the processor is further configured to:
    receive a signal from the BS, and
    select the first Tx beam by performing a beam sweeping process on the signal.

11. The first UE of claim 9, wherein the processor is further configured to:
    transmit the first information on the first Tx beam at a timing point,
    wherein the timing point is identical to a timing point at which the channel quality information is transmitted to the BS, or is different from a timing point at which the channel quality information is transmitted to the BS.

12. The first UE of claim 9, wherein the processor is further configured to:
    include the first information on the first Tx beam to a message, wherein the message is identical to a message through which the channel quality information is transmitted or is different from a message through which the channel quality information is transmitted, and
    transmit, to the BS, the message.

13. The first UE of claim 9, wherein the processor is further configured to
    transmit the first information on the first Tx beam by a period during which channel status is static.

14. A base station (BS) for transmitting transmission beam (Tx beam) information in a communication system supporting a multi-user multi-input multi-output (MU-MIMO) scheme, the BS comprising:
    a transmitter;
    a receiver; and
    a processor configured to:
       receive, from a first user equipment (UE), first information on a first Tx beam selected by the first UE;
       transmit, to at least one second UE, the first information on the first Tx beam selected by the first UE; and
       receive, from the at least one second UE, channel quality information,
    wherein the channel quality information is determined based on a signal to interference and noise ratio (SINK) by using a strength of the first Tx beam as a strength of the interference.

* * * * *